United States Patent [19]
Garnier

[11] 3,803,716
[45] Apr. 16, 1974

[54] HANDPIECES FOR DENTAL SURGERY AND THE LIKE
[75] Inventor: Marcel Garnier, Besancon, France
[73] Assignee: Micro Mega S.A., Besancon, France
[22] Filed: Apr. 14, 1972
[21] Appl. No.: 244,017

[30] Foreign Application Priority Data
Apr. 13, 1971  Japan.............................. 46-14038
Mar. 2, 1972  Japan.............................. 47-07285

[52] U.S. Cl. .................................................. 32/26
[51] Int. Cl. ............................................. A61c 1/08
[58] Field of Search ....... 32/26, DIG. 8, 27; 279/66, 279/51

[56] References Cited
UNITED STATES PATENTS
3,667,125   6/1972   Seigneurin .......................... 32/26

Primary Examiner—Robert Peshock

[57] ABSTRACT

A dental surgery handpiece for interchangeable rotatable tools includes a chuck accessible through an open end of a tubular support, opening and closing of the chuck being controlled by rotation of an actuating ring inside the support and accessible through openings therein. The chuck is mounted on a driving shaft, the chuck/shaft assembly being freely rotatable when a locking pin assumes a disengaged position and part of the chuck/shaft assembly being locked against rotation to enable operation of the actuating ring when said pin assumes a locking position. A sleeve slidably mounted on the support between two positions closes said openings and disengages said pin in a first position, and allows access to the actuating ring through said openings in a second position in which it holds said pin in its locking position.

8 Claims, 6 Drawing Figures

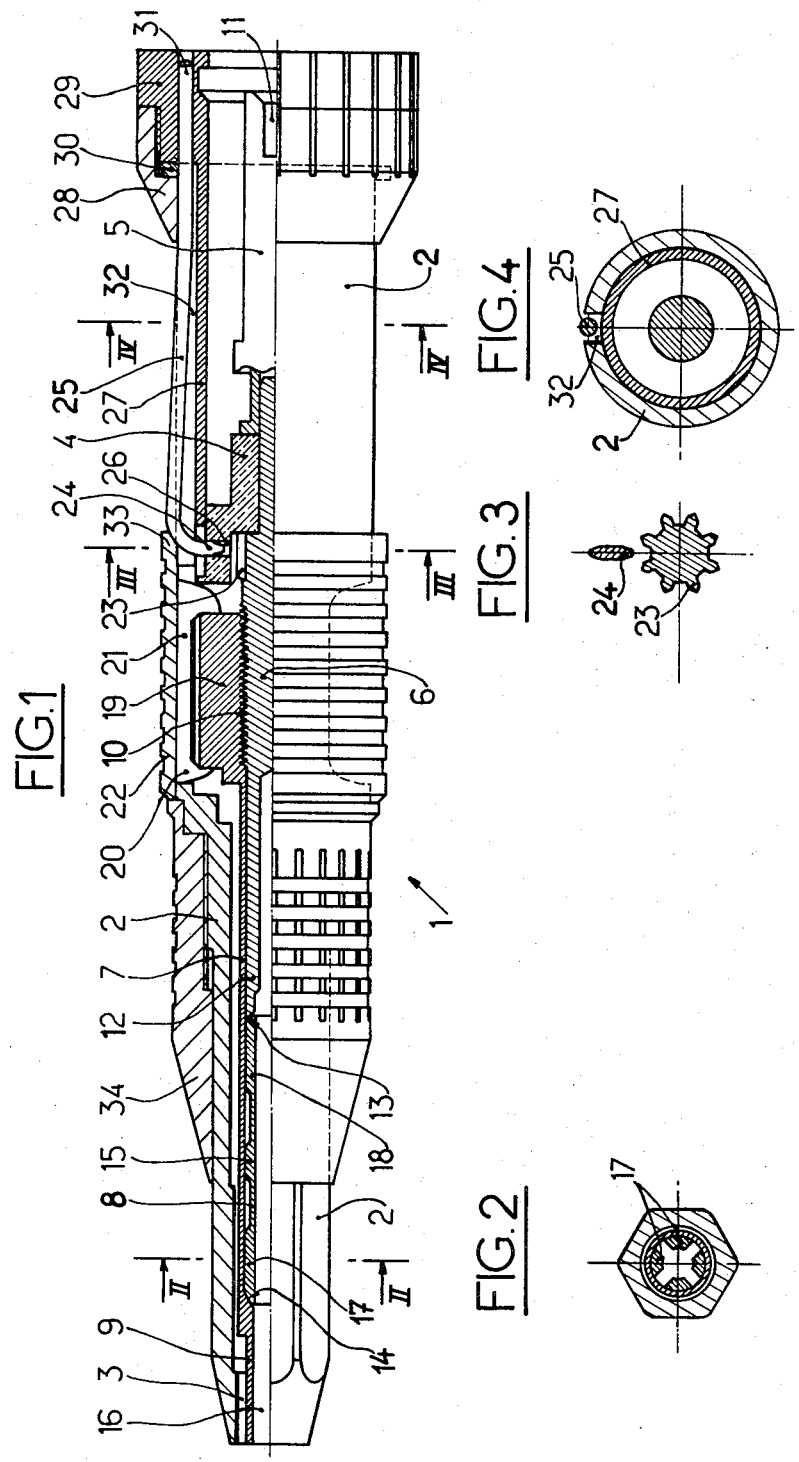

HANDPIECES FOR DENTAL SURGERY AND THE LIKE

The invention relates to handpieces for interchangeable rotatable tools, for example for dental surgery and the like.

A known type of dental surgery handpiece or adaptor, with micromotor drive, comprises a rotatable shaft in the adaptor housing, a chuck consisting of clamping jaws and a clamping sleeve for interchangeably fitting a tool, an adjustable locking part for connecting one of the chuck components non-rotatably with the adaptor housing, and an actuator for adjusting the other chuck component.

In order to open or close the chuck of a dental surgery adaptor of this kind for fitting or interchanging a work tool, e.g., a drill, it is necessary to suitably displace the clamping sleeve axially relative to the jaws, whereupon an external frusto-conical surface on the jaws and an internal frusto-conical surface of the clamping sleeve cooperate either to spread apart, or press together, the clamping jaws. For this purpose that chuck component which is securely fixed to the central shaft in the adaptor housing must be locked against rotation, and the other chuck component must be suitably adjusted by a special actuator, whereby through a screwing action in one direction or the other, the clamping sleeve is displaced axially relative to the jaws, or the jaws are displaced axially relative to the clamping sleeve. However, since in dental surgery adaptors of this kind, which are intended for direct connection to a micromotor, neither the chuck components, nor the central shaft in the adaptor housing and the micromotor shaft connected with the latter, are immediately accessible from outside, there must be provided suitable, easy-to-service locking and actuating parts for manipulation of the chuck.

A known dental surgery adaptor of this kind (W. German "Offenlegungsschrift" No. 1 945 688) has an adaptor housing consisting of two relatively rotatable casings and a locking part which is axially displaceable relative to the adaptor housing and is held in its disengaged position by a spring. An axially displaceable clutch member is provided in the adaptor housing and normally, when the locking part is in its disengaged position assumes its de-clutched or disengaged position. On displacement of the locking part into its locking position, on the one hand the clamping sleeve screwed onto the driving shaft in the adaptor housing is non-rotatably connected with the one casing, and on the other hand the clutch member is displaced into its clutched or engaged position, in which the driving shaft is non-rotatably connected with the other casing. If the two casings are now rotated relative to one another, the clamping sleeve is screwed in one direction or the other relative to the shaft and therefore to the clamping jaws mounted at the front of the shaft which are thereby either opened or closed.

Locking of the clamping sleeve non-rotatably with the one casing results from the meshing of a locking pin in cylindrical toothing on the clamping sleeve.

In this known dental surgery adaptor, not only are two relatively rotatable casings required, but also a special complex clutch member in the adaptor housing, as well as suitable toothing, cooperating with this clutch member, on the shaft and/or the inside of the one casing.

It is an object of the invention to simplify the construction and operation of a dental surgery adaptor or handpiece of the kind referred to at the outset.

According to the invention, a handpiece for interchangeable rotatable tools comprises an elongate tubular support, a driving shaft coaxially rotatably mounted in the support, a chuck secured to an end of the shaft, said chuck being accessible through an open end of the support and including an inner component having radially movable clamping jaws and an outer component having a clamping sleeve, said components being relatively displaceable to radially adjust the clamping jaws by cooperation thereof with the clamping sleeve, a locking member movably mounted on the support between a locking position in which it locks a part integral with the shaft or with one of the components of the chuck against rotation relative to the support and a disengaged position in which the chuck and shaft are free to rotate in the support, an actuating ring coaxially mounted about said shaft, said actuating ring being rotatably displaceable when said part is locked against rotation and being associated with means for converting such a rotational displacement thereof into a relative displacement of said component to radially adjust the clamping jaws, an opening in the support through which opening the actuating ring is accessible, and a cover movably mounted outside the support between a first position covering said opening and a second position allowing access to the actuating ring through said opening, said cover cooperating with the locking member such that in said first position the locking member is in its disengaged position and in said second position the locking member is in its locking position.

Preferably, the driving shaft and one of said components are axially fixed, and the other of said components is axially movable, said clamping sleeve cooperating with the clamping jaws to radially adjust the clamping jaws when the axially movable component is axially displaced relative to the axially fixed component. The locking member may then be adapted to lock the axially fixed component or a part axially holding the axially fixed component, and the actuating ring associated with means for converting said rotational displacement thereof into an axial displacement of the axially movable component.

In this way, after displacement of the cover from its first to its second position, one of the two chuck components, for example, may be non-rotatably connected with the support and the actuating ring is freely accessible for axial displacement of the other chuck component through screwing. For actuating the chuck, therefore, the support is held in one hand, while with the fingers of the other hand the actuating ring, which is preferably knurled and accessible through two diametrically opposite openings in the support, is rotated in one sense or the other. If necessary, this operation can be performed with only one hand in that the actuating ring can be rotated, for example, with the thumb and forefinger of the hand holding the support.

In one embodiment of the invention, the outer component of the chuck is fixed to and axially movable with the actuating ring, said actuating ring being threadably mounted on the shaft, said inner component of the chuck being axially fixed between a stop face on the shaft and a stop face on said outer component, at least one of said stop faces being substantially frusto-conical and cooperating with said clamping jaws, and said locking member when in its locking position engaging with the shaft to lock the shaft against rotation relative to the support.

In another embodiment of the invention, the outer component of the chuck is axially fixed and the actuating ring is fixed to the shaft, said inner component of the chuck including an internally threaded rear sleeve portion threadably engaged on a screw at said one end of the shaft, said inner component being axially slidable in but held against rotation relative to the outer component, and said locking member when in its locking position engaging with the outer component of the chuck to prevent rotation of the chuck relative to the support.

Two embodiments of the invention will now be described, by way of example, with reference to the accompanying drawings, in which:

FIG. 1 is an elevational view of the first embodiment of handpiece according to the invention, partly in axial cross-section;

FIG. 2 is a cross-section taken along line II—II of FIG. 1;

FIG. 3 is a cross-section through the shaft and the locking member, taken along line III—III of FIG. 1;

FIG. 4 is a cross-section taken along line IV—IV of FIG. 1;

Figure 5:
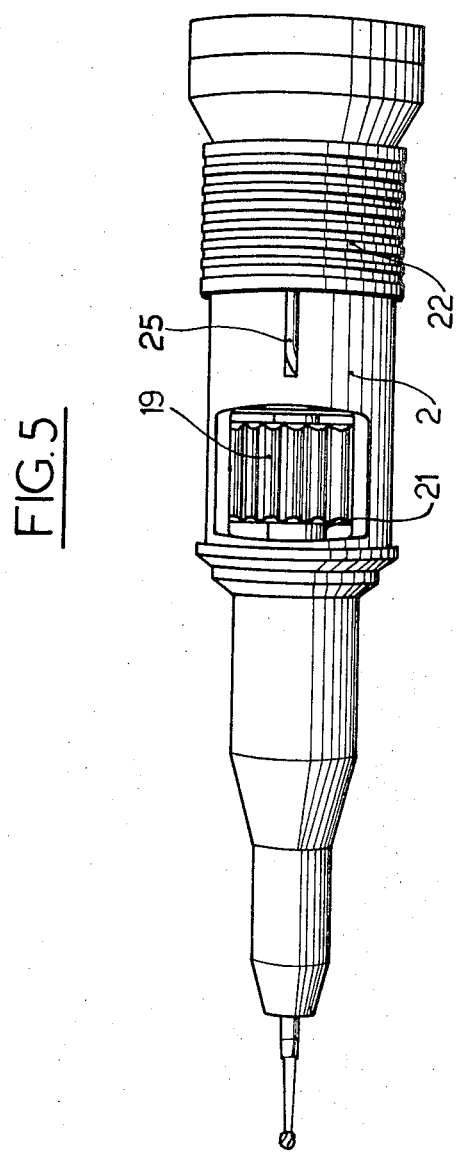
FIG. 5 is an external view of the handpiece of FIGS. 1 to 4 with a treating tool fitted.

As shown in FIG. 1, the handpiece designated generally by 1, has an elongate tubular support in the form of a housing 2 in which a central driving shaft 6 is coaxially mounted to rotate freely. A connecting piece 5, fixed on a rear portion of the shaft 6, has a diametral slot 11 at its rear end for engaging a corresponding flat shoulder of a micromotor shaft, not shown. A clamping sleeve 7 made in one piece with an actuating ring 19 is screwed onto the shaft 6 by means of an internal thread 10 disposed in the rear portion of the clamping sleeve 7 at the level of the actuating ring 19. The forward cylindrical portion of the clamping sleeve 7 rests frictionally on the forward portion 12 of the shaft 6 and extends to a forward open end of the housing 2. The clamping sleeve 7 forms an outer component of a chuck which also includes an inner component 8 with radially deformable clamping jaws 17 and 18 axially secured within the clamping sleeve 7 between a frusto-conical stop face 13 of a forward portion 12 of the shaft 6 and a frusto-conical stop face 14 on the inner surface of the clamping sleeve 7, said inner component 8 being additionally supported by a central ring-like shoulder 15 bearing against a central cylindrical surface of the clamping sleeve 7. The frusto-conical stop faces 13 and 14 cooperate with the ends of the jaws 17 and 18, which are likewise frusto-conically bevelled. The chuck, which is accessible through the open end of the housing 2 and may be rotatably driven together with the central shaft 6 and the rear connecting piece 5 by means of a micromotor, not shown, is freely rotatably mounted in a forward bearing 3, which receives a forward end 9 of the clamping sleeve 7. A rear bearing 4, constituted by a shoulder engaging between radial shoulders of the shaft 6 and the connecting piece 5, allows the shaft 6 to rotate freely whilst preventing axial movement thereof.

In the region of the actuating ring 19, the housing 2 has an enlarged inner chamber 20, in which the actuating ring 19 can rotate freely, and two diametrically opposite openings 21 (FIGS. 1 and 5), which are normally covered by an axially displaceable outer cover in the form of a sleeve or service bush 22 mounted on a smooth cylindrical outer surface of the housing 2. In the position of the service bush 22 shown in FIG. 1, its leading or forward edge pushes against the protruding trailing edge of a socket 34 screwed onto the housing 2, said socket 34 being externally knurled to form a gripping part of the handpiece 1. The outer surface of the service bush 22 and the outer surface of the actuating ring 19 are likewise knurled to facilitate manipulation thereof.

The bearing 4 is held in a bearing sleeve 27, which is inserted in the rear portion of the housing 2 and secured by an outer nut 28. Said nut 28 passes about the rear end of the housing 2 and is screwed against an annular shoulder 29 of the bearing sleeve 27 projecting from the rear end of the housing 2, an annular flange 30 of the housing 2 being jammed between the nut 28 and the annular shoulder 29. A spring in the form of a resilient rod 25 is disposed in a longitudinal groove 32 on the outer surface of the rear portion of the housing 2, the rear end of this rod being force-fitted in a hole 31 of the annular shoulder 29, and its forward end being bent radially inwardly to form a locking pin 24. This locking pin 24 slidably passes through a radial opening 26 of the bearing 4 and an inner end thereof engages, when the rod 25 is pressed radially inwards, with cylindrically disposed toothing 23 on the shaft 6. In its position shown in FIG. 1, the service bush 22 is disposed with an outwardly flaring bevelled trailing edge 33 bearing lightly against an outer bent portion of the rod 25, and the rod 25 is so released that an outer part of the pin 24 and rod 25 protrude from the outer surface of the casing 2 whilst the inner end of the pin 24 is out of engagement with the toothing 23. In this normal or rest position of the service bush 22, with the locking pin 24 in its disengaged position, the openings 21 are covered by the service bush 22, and the handpiece 1 can, with a work tool fitted in the chuck, be driven to effect a dental treatment for example.

To actuate the chuck, the service bush 22 is displaced axially into its rear position, whereby the resilient rod 25 is pressed radially inwards into its locking position by the trailing edge 33 of the service bush 22 which slides over and inwardly presses the outer bent portion of the pin 24, and the openings 21 are cleared. In this rear position of the service bush 22, as shown in FIG. 5, the actuating ring 19 is accessible through the openings 21 and the rod 25 is held by the service bush 22 in its locking position, in which the locking pin 24 engages in the toothing 23 of the shaft 6, and thereby locks the shaft 6 against rotation. The actuating ring 19 and clamping sleeve 7 are then screwed in one direction or the other relative to the shaft 6, whereby the clamping sleeve 7 is displaced axially relative to the shaft 6. The frusto-conical stop faces 13 and 14 on the shaft 6 and clamping sleeve 7 thus either approach one another or recede from one another. In the first case, the clamping jaws 17 and 18 of the chuck are pressed radially inwards to clamp a work tool introduced into the opening 16 of the chuck; in the second case, they are opened to release a clamped work tool. Subsequently, the service bush 22 is moved back into its forward position, as shown in FIG. 1, in which the handpiece is ready to be driven.

Figure 6:
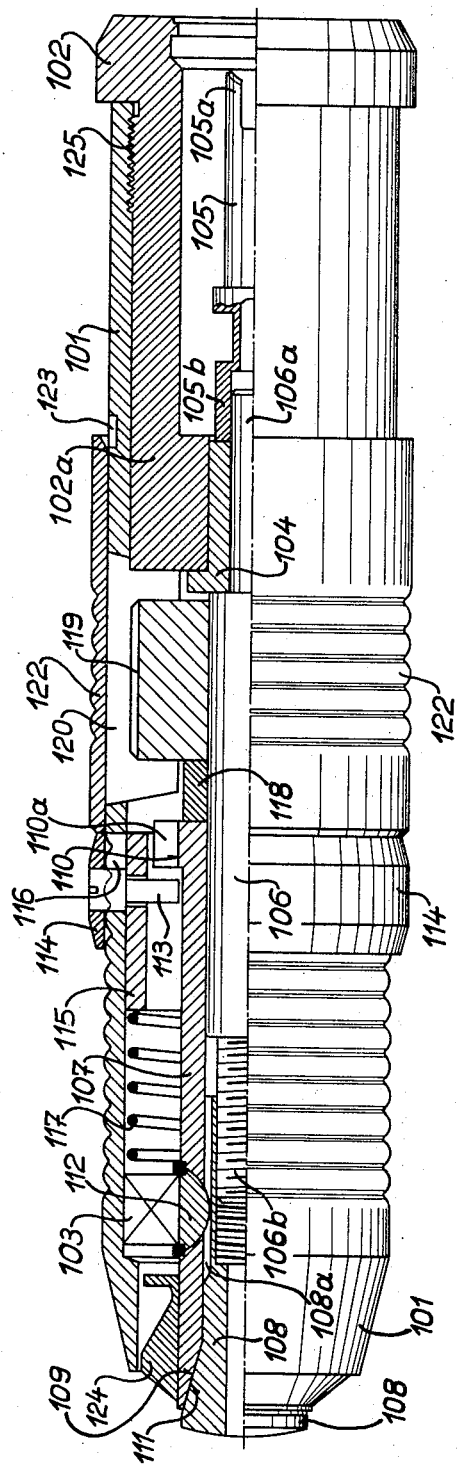
FIG. 6 is an elevational view of the second embodiment of handpiece, partly in axial cross-section.

In the embodiment shown in FIG. 6, a central driving shaft 106 coaxially disposed in an elongate tubular adaptor housing 101 is rotatably mounted in a bearing 104, which surrounds a region 106a of the shaft of reduced diameter. This bearing 104 is held by an inner shoulder 102a of a bush 102, which is screwed into an inner thread 125 at the rear end of the housing 101. A connecting piece 105 is secured to the rear end of the shaft 106 by means of a fastening collar 105b, and has a rear diametral slot 105a for engaging a flat shoulder of a micromotor shaft, not shown, an annular chamber being provided between the bush 102 and the connecting piece 105 for the micromotor flange.

At its forward end, the shaft 106 has a thread 106b, onto which is screwed an internally threaded rear sleeve portion of the inner component of a chuck, which inner component includes a plurality of resilient radially deformable gripping jaws 108. An external frusto-conical surface 111 at the forward end of the jaws 108 cooperates with an internal frusto-conical surface 109 of a clamping sleeve 107, which is pushed on to the shaft 106 under sliding friction and is rotatably mounted in a bearing 103. The rear end of the clamping sleeve 107 has a cylindrically disposed toothing, formed by axial indentations 110a disposed over the surface of an annular flange 110. A convexly curved wedge 112 is secured to and protrudes inwardly of the clamping sleeve 107 and engages in a longitudinal outer groove 108a on the rear sleeve portion of the inner component of the chuck, whereby said inner component is nonrotatably connected with the clamping sleeve 107, but is mounted axially displaceable relative to the latter. A spacing ring 118 is mounted on the shaft 106 between the clamping sleeve 107 and an actuating ring 119 with a knurled outer surface, which actuating ring 119 is fixed to the shaft 106. Level with this actuating ring 119, the housing 101 has two diametrically opposite openings 120, which are normally covered by a service bush 122 axially slidably mounted on a cylindrical outer surface of the housing 101. A radially disposed locking pin 113, fixed to two coaxial rings 114 and 115, penetrates a longitudinal slot 116 in the forward part of housing 101 and is slidable in a direction perpendicular to its axis along this slot. The outer ring 114 slides on the outer surface of the housing 101, while the inner ring 115 slides on the inner surface of the housing and is subject to the action of a helical spring 117, surrounding the clamping sleeve 107 and disposed between the forward bearing 103 and a leading or forward edge of the ring 115. In the position shown in FIG. 6, a forward end of the service bush 122 bears against a rear end of the outer ring 114 and the locking pin 113 is held, against the action of the spring 117, in its disengaged position, in which the locking pin 113 is out of engagement with the toothing 110, 110a of the clamping sleeve 107. An annular spring 123 lying in an outer annular groove of the housing 101 releasably holds the service bush 122 in this position against the action of the spring 117. When the service bush 122, under compression of the annular spring 123, is displaced into its rear position up to the stop surface on the projecting outer annular edge of the bush 102, the spring 117 presses the locking pin 113 into its locking position, in which it lies against the righthand end of the longitudinal slot 116 (looking at FIG. 6) and engages in the toothing 110, 110a of the clamping sleeve 107, so that the two components of the chuck are locked against rotation. In this position, the actuating ring 119 is accessible through the openings 120.

Moreover, a shaped guard ring 124 is force fitted onto and protrudes radially outwardly from the forward end of the clamping sleeve 107. This guard ring 124 is freely rotatably mounted in a cylindrical recess at the open end of the handpiece and prevents entry of contaminants into the interior of the housing.

In the position of the service bush 122 shown in FIG. 6, the clamping sleeve 107 is not locked, the openings 120 are covered, and the handpiece is ready to be driven for treatment, with a tool in the chuck. To actuate the chuck, the service bush 122 is rearwardly displaced, so that the actuating ring 119 and shaft 106 can be rotated relative to the clamping sleeve 107, which is locked against rotation by the locking pin 113. The shaft 106 is thereby screwed relative to the chuck jaws 108, which are connected non-rotatably with the clamping sleeve 107 by the wedge 112 and are therefore also held against rotation relative to the casing. The cooperation of the external frusto-conical surface 111 of the jaws 108 with the internal frusto-conical surface 109 of the clamping sleeve 107 either opens the chuck jaws for inserting a tool, or presses them radially inwardly for securing an inserted tool.

The described handpieces are of simple construction, in as much as no complex, displaceable clutch members are necessary, whereby the assembly and maintenance of the handpiece are simplified, whilst servicing of the chuck can be achieved simply and conveniently.

What is claimed is:

1. A handpiece for interchangeable rotatable tools, comprising an elongate tubular support, a driving shaft coaxially rotatably mounted in the support, a chuck secured to an end of the shaft, said chuck being accessible through an open end of the support and including an inner component having radially movable clamping jaws and an outer component having a clamping sleeve, said components being relatively displaceable to radially adjust the clamping jaws by cooperation thereof with the clamping sleeve, a locking member movably mounted on the support between a locking position in which it locks a part integral with the shaft or with one of the components of the chuck against rotation relative to the support and a disengaged position in which the chuck and shaft are free to rotate in the support, an actuating ring coaxially mounted about said shaft, said actuating ring being rotatably displaceable when said part is locked against rotation and being associated with means for converting such a rotational displacement thereof into a relative displacement of said components to radially adjust the clamping jaws, an opening in the support through which opening the actuating ring is accessible, and a cover movably mounted outside the support between a first position covering said opening and a second position allowing access to the actuating ring through said opening, said cover cooperating with the locking member such that in said first position the locking member is in its disengaged position and in said second position the locking member is in its locking position.

2. A handpiece according to claim 1, in which said driving shaft and one of said components are axially fixed, and the other of said components is axially movable, said clamping sleeve cooperating with the clamping jaws to radially adjust the clamping jaws when the axially movable component is axially displaced relative to the axially fixed component, said locking member being adapted to lock the axially fixed component or a part axially holding the axially fixed component, and said actuating ring being associated with means for converting said rotational displacement thereof into an axial displacement of the axially movable component.

3. A handpiece according to claim 2, in which the outer component of the chuck is fixed to and axially movable with the actuating ring, said actuating ring being threadably mounted on the shaft, said inner component of the chuck being axially fixed between a stop face on the shaft and a stop face on said outer component, at least one of said stop faces being substantially frusto-conical and cooperating with said clamping jaws, and said locking member when in its locking position engaging with the shaft to lock the shaft against rotation relative to the support.

4. A handpiece according to claim 3, in which said locking member is a pin slidably mounted in a radial aperture in the support between a locking position in which an inner end of the pin engages with a cylindrically disposed toothing on the shaft and a disengaged position in which an outer part of the pin protrudes from the outer surface of the support, a spring urging said pin from the locking position towards the disengaged position, said cover when in its first position allowing the pin to adopt the disengaged position and when in its second position being located over said aperture to hold the pin in the locking position.

5. A handpiece according to claim 4, in which said spring is a resilient rod disposed in a longitudinal outer groove of the support and secured towards one end thereof to the support, the other end of the rod being bent radially inwardly to form said locking pin, said cover being formed by an outer sleeve axially slidably mounted on the support, said outer sleeve including an outwardly flaring bevelled trailing edge adapted to slide over and press inwardly against an outer bent portion of said rod adjacent to said other end thereof when the outer sleeve is moved from the first towards the second position.

6. A handpiece according to claim 2, in which the outer component of the chuck is axially fixed and the actuating ring is fixed to the shaft, said inner component of the chuck including an internally threaded rear sleeve portion threadably engaged on a screw at said one end of the shaft, said inner component being axially slidable in but held against rotation relative to the outer component, and said locking member when in its locking position engaging with the outer component of the chuck to prevent rotation of the chuck relative to the support.

7. A handpiece according to claim 6, in which said locking member is a pin disposed radially in relation to the support and movable in a direction perpendicular to its axis along a longitudinal slot in the support, a spring urging said pin from the disengaged position towards the locking position in which an inner end part of the pin engages with a cylindrically disposed toothing on the outer component of the chuck, said cover being formed by an outer sleeve axially slidably mounted on the support and being adapted in its first position to hold said pin in its disengaged position against the action of said spring.

8. A handpiece according to claim 7, in which said locking pin is secured between coaxial outer and inner rings respectively axially slidably mounted against outer and inner surfaces of the support, said spring being a helical compression spring acting against a forward end of the inner ring facing towards said open end of the support, said outer sleeve having a forward end adapted when in said first position to bear against a rear end of the outer ring, said outer sleeve being releasably held in its first position against the action of said compression spring by means of an annular spring disposed in an outer annular groove of the support and cooperating with a rear end of said outer sleeve.

* * * * *